April 28, 1970 R. H. YEO ET AL 3,508,446
VALVE ACTUATING MECHANISM
Original Filed July 11, 1966 2 Sheets-Sheet 1
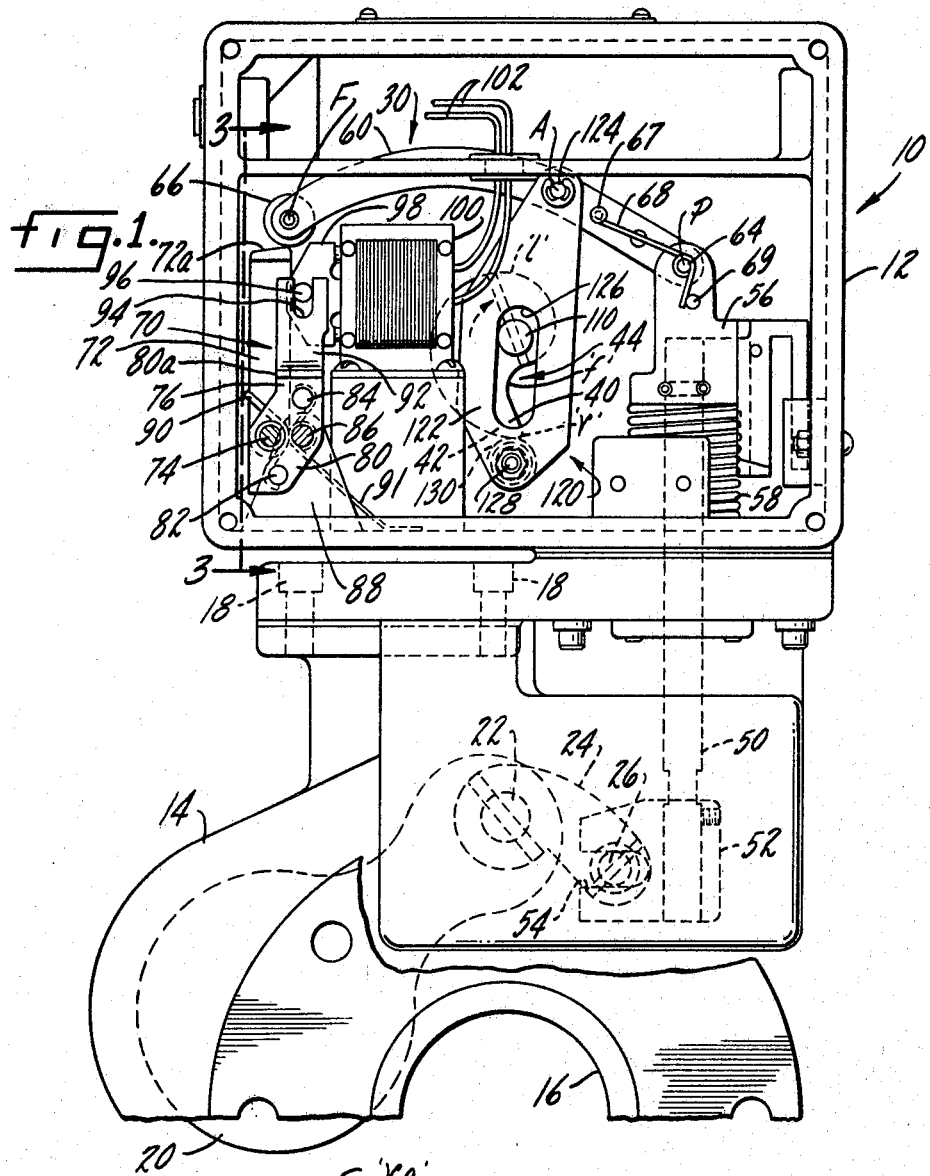
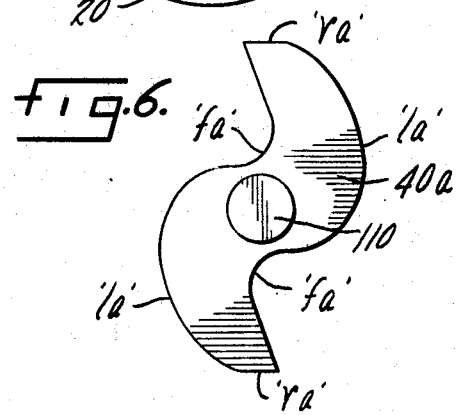
INVENTORS.
ROBERT H. YEO
HAROLD W. CROWE
BY
Hume, Groen, Clement & Hume
Attorneys.

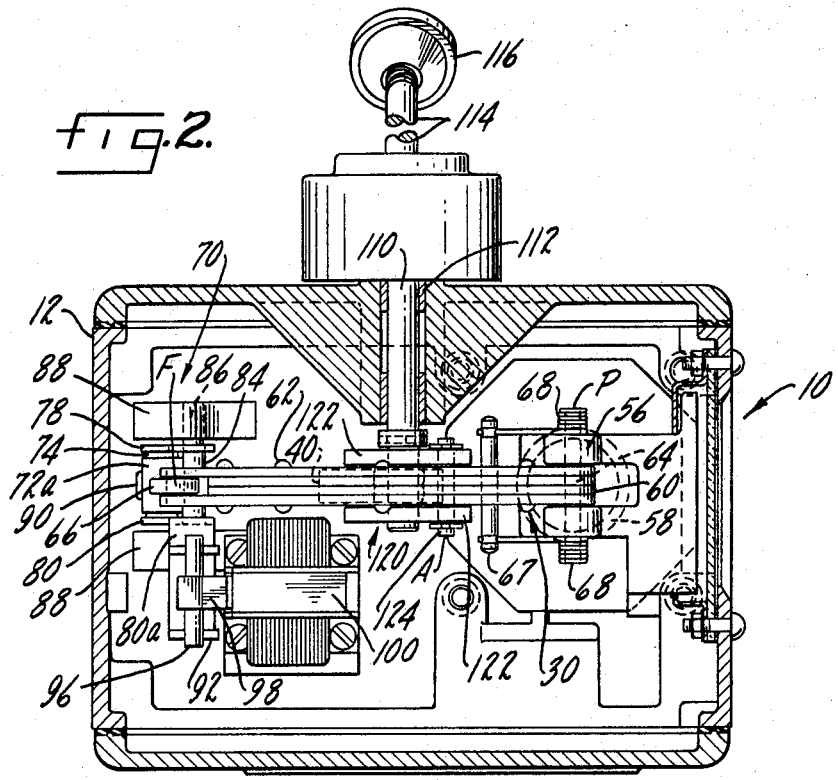
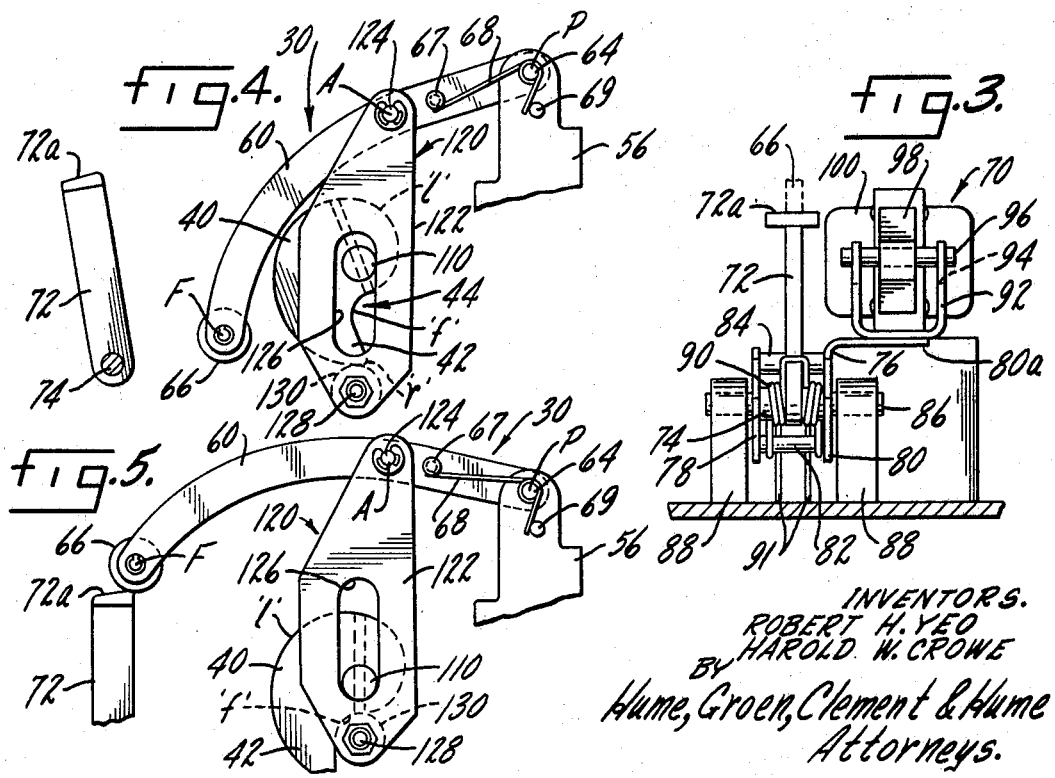

United States Patent Office 3,508,446
Patented Apr. 28, 1970

3,508,446
VALVE ACTUATING MECHANISM
Robert H. Yeo and Harold W. Crowe, Muncie, Ind., assignors to Maxon Premix Burner Company, Inc., Muncie, Ind., a corporation of Indiana
Continuation of application Ser. No. 564,085, July 11, 1966. This application Nov. 6, 1968, Ser. No. 808,712
Int. Cl. F16h 5/40
U.S. Cl. 74—2                                    11 Claims

ABSTRACT OF THE DISCLOSURE

A safety valve actuating mechanism including valve operating means movable between a first position and a second position and biased toward said second position, lever means pivotally connected to the operating means and defining fulcrum point means spaced from the operating means which is movable between a latched position and released position and biased toward said latched position, latching means releasably retaining the fulcrum point means in the latched position, and cam and cam follower means connected to said lever means and adapted to control the movement of the valve operating means with the fulcrum point means of the lever means supported by the latching means and to permit the biasing means to swing the fulcrum point means into engagement with the latching means to recock the mechanism.

---

The present application is a continuation of co-pending application Ser. No. 564,085, filed July 11, 1966, and now abandoned.

This invention relates generally to a safety valve apparatus and, more particularly, relates to an improved valve actuating mechanism for use in safety valve assemblies such as described and claimed in United States Patent No. 3,082,627, assigned to the same assignee as the present application.

The principal object of this invention is to provide an improved safety valve apparatus for use in compressible or incompressible fluid systems.

Another object of this invention is to provide a safety valve apparatus with an improved valve actuating mechanism having a very high mechanical advantage, thereby permitting the safety valve to operate efficiently in fluid systems having substantial line pressure.

A further object of this invention is to provide a valve actuating mechanism which will securely maintain a safety valve in a normal position and permit the safety valve to move rapidly into an emergency position in response to an emergency signal.

A still further object of this invention is to provide a safety valve actuating mechanism which recocks rapidly, and which is operable to quickly begin to reset the valve into its normal position after an emergency condition has passed.

An additional object of this invention is to provide a safety valve actuating mechanism which permits the safety valve to be rapidly reset into its normal position within a short predetermined period of time.

An additional object of this invention is to provide an actuating mechanism which is operable to selectively control the positioning of a safety valve under normal conditions, and which may respond to an emergency signal to become inoperative until normal conditions are reestablished and the actuating mechanism is reset.

Additional objects and features of this invention will become more apparent from a description of an embodiment thereof, taken in conjunction with the following drawings, in which:

FIGURE 1 is an elevational view of a safety valve apparatus including a valve actuating mechanism embodying the features of this invention, showing the safety valve maintained in a normal opened position;

FIGURE 2 is a plan view of the safety valve apparatus illustrated in FIGURE 1;

FIGURE 3 is a cross-sectional view taken along the line 3—3 in FIGURE 1, illustrating the releasable latch assembly of the safety valve actuating mechanism;

FIGURE 4 is a partial elevational view illustrating the arrangement of the valve actuating mechanism with the safety valve in an emergency closed position;

FIGURE 5 is a partial elevational view illustrating the valve actuating mechanism in a recocked condition in preparation of resetting the safety valve from the closed position shown in FIGURE 4 to the normal open position shown in FIGURE 1;

FIGURE 6 is a removed plan view of a multi-lobed cam which may be employed in the safety valve actuating mechanism in accordance with this invention.

Briefly described with reference to FIGURE 1, the invention provides a safety valve apparatus 10 having a safety valve 20 with an improved valve actuating mechanism 30. In accordance with this invention, the actuating mechanism 30 includes a cam member 40 which is operably connected to the safety valve 20, and which is selectively rotatable through a complete 360-degree arc. As explained further below, the actuating mechanism 30 including the rotatable cam member 40 will thereby control the movement of the safety valve 20 under normal operating conditions, but permit the rapid movement of the valve 20 to an emergency position in response to a signal indicating the existence of an emergency. Moreover, the cam member 40 can be selectively rotated to recock the valve actuating mechanism 30 and rapidly reset the safety valve 20 in its normal position after the emergency has passed.

The valve actuating mechanism 30 embodying the features of this invention therefore permits the position of the safety valve 20 to be rapidly changed in response to changing conditions of the fluid system in which the valve apparatus 10 is employed. As a result, the valve apparatus 10 including the actuating mechanism 30 is readily adaptable for use in fluid systems provided with quick-acting control devices such as automatic shut-down equipment and the like. The rotatable cam member 40 additionally provides the valve actuating mechanism 30 with a substantially improved mechanical advantage, thereby allowing the safety valve apparatus 10 to operate efficiently in fluid systems having high line pressure.

Referring to FIGURES 1 and 2 in more detail, the valve apparatus 10 includes an upper housing 12 containing the valve actuating mechanism 30 and a lower housing 14 containing the safety valve 20. The lower housing 14 encompasses a pipeline 16 through which the fluid to be controlled by the valve apparatus 10 will flow. Suitable bolts 18 and gasket material (not shown) join the upper housing 12 to the lower housing 14 in a fluid-impervious relationship. The fluid flowing through the pipeline 16 is thereby precluded from entering the upper housing 12, where the fluid may interfere with the operation of the valve actuating mechanism 30 or damage the mechanism.

As seen in FIGURE 1, the safety valve 20 is preferably of the gate valve type, and is rotatably mounted adjacent the fluid pipeline 16 by a pivot pin 22. As is well-known to those skilled in the art, the gate valve 20 can therefore rotate about the pivot pin 22 from a retracted or open position within the lower housing 14, where the fluid pipeline 16 is unobstructed, to a closed position aligned with the pipeline 16, where the flow of fluid in the pipeline 16 is blocked by the valve. A suitable link 24 is connected to the pivot pin 22 to control the movement of the gate valve 20 between the above-described opened and closed positions.

As further seen in FIGURE 1, the valve actuating mechanism 30, in addition to the cam member 40, includes an elongate valve operating rod 50. The operating rod 50 extends downwardly from the upper housing 12 into the lower housing 14 through suitable sealing gaskets (not shown) and has its lower end connected to the link 24. To accomplish this connection, the link 24 is preferably provided with a slide pin 26 and the lower end of the operating rod 50 is provided with a member 52 defining a slot 54. The slide pin 26 engages the member 52 within the slot 54 to form a pin and slot-type connection between the link 24 and the operating rod 50. By this arrangement, longitudinal movement of the valve operating rod 50 will be transferred to the link 24 by the above-described pin and slot connection, and will cause the gate valve 20 to pivot about the pivot pin 22. In the illustrated embodiment, upward movement of the operating rod 50 as viewed in FIGURE 1 will result in movement of the gate valve 20 toward its closed positon in alignment with the pipeline 16. Conversely, any downward movement of the operating rod 50 will retract the gate valve 20 toward its opened position with respect to the pipeline 16. A valve operating body 56 is connected to the upper end of the operating rod 50, and a compression spring 58 is placed between the upper housing 12 and the valve operating body 56, so that the rod 50 is spring-biased upwardly as viewed in FIGURE 1. Accordingly, the compression spring 58 constantly biases the gate valve 20 toward the closed position.

In order to control the longitudinal movement of the operating rod 50, and thus control the positioning of the gate valve 20, the valve actuating mechanism 30 further includes an arcuately shaped lever arm 60. As seen in FIGURES 1 and 2, the lever arm 60 is preferably formed from a pair of spaced arms riveted together by suitable rivets 62. This construction provides the arm 60 with sufficient strength and rigidity for prolonged use in the valve actuating mechanism 30. The lever arm 60 is pivotly connected to the body 56 of the operating rod 50 by means of a suitable pivot pin 64. The pin 64 thus defines an operating point P about which the arm 60 will rotate with respect to the rod 50 during the operation of the valve actuating mechanism 30.

The lever arm 60 in accordince with this invention includes a roller 66 at the end of the arm opposite the pivot pin 64. As explained further hereinafter, the roller 66 defines a fulcrum point F for the arm 60 which is transversely spaced from the operating point P defined by the pivot pin 64. It is apparent from FIGURE 1 that if the fulcrum point F is secured or supported in a suitable manner, a force acting downwardly upon the arm 60 will pivot the arm 60 about the fulcrum point F and move the operating point P in a downward direction. Such downward force will in turn transfer to the operating rod 50 through the pin 64 to counteract the upward biasing force of the compression spring 58. A downward force on the lever arm 60 will thus urge the gate valve 20 toward the open position illustrated in FIGURE 1 in the presence of adequate support for the lever arm fulcrum point F.

Finally, the arm 60 in accordance with the present invention is capable of pivoting about the pivot pin 64 to swing the roller 66 and the associated fulcrum point F vertically in response to longitudinal movement of the operating rod 50. The valve actuating mechanism 30 and the gate valve 20 are arranged so that the fulcrum point F of the arm 60 can swing between the raised or latched position shown in FIGURE 1 and the lower or released position illustrated in FIGURE 4. As seen in FIGURE 4, the arcuate shape of the arm 60 permits the point F to move to this released poistion without any interference between the arm 60 and the cam member 40. A set of torsion springs 68 is mounted about the pivot pin 64 and engaged between the anchor pins 67 and 69 on the arm 60 and the body 56 respectively, as clearly shown in FIGURES 1 and 2, to constantly bias the fulcrum point F of the arm 60 toward the above-described raised or latched position.

The valve actuating mechanism 30 in accordance with the present invention additionally includes a releasable latch assembly 70 positioned within the upper housing 12 adjacent the roller 66. Generally, the latch assembly 70 includes a support stool 72 having a contact surface 72a engageable with the roller 66 to releasably retain the roller 66 and the arm fulcrum point F in the latched position shown in FIGURE 1. As particularly shown in FIGURES 1 and 3, the support stool 72 is pivoted by a pin 74 to a rocker or bell crank 76. The bell crank 76 has a pair of side plates 78 and 80 interconnected by the pin 74 and by spacing rivets 82 and 84, and is pivotally supported within the upper housing 12 by a fixed pin 86 extending between a pair of bosses 88. In addition, a torsion spring 90 is mounted about the pin 74 and interconnected between the support stool 72 and the crank 76 to bias the stool 72 in a clockwise direction a sviewed in FIGURE 1. The spacing rivet 84 functions as a stop to limit the clockwise movement of the support stool 72. As seen in FIGURE 3, the side plate 80 of the crank 76 includes a lateral projection 80a which supports a yoke 92 having slots 94 in its upper end. By this arrangement, the slots 94 will slidably receive a pin 96 carried by an armature 98 of an electromagnetic device 100. Conducting wires 102 connect the electromagnetic device 100 to a suitable control circuit.

The above-described latch assembly 70 is substantially the same as the similarly functioning latch assembly disclosed in the above-mentioned United States Patent No. 3,082,627. As explained in said patent, the fixed pin 86 supporting the crank 76 and the support stool 72 is positioned a substantial distance below the fulcrum point F of the arm 60 when the roller 66 is engaged with the support stool 72, such as shown in FIGURE 1. Furthermore, the upper contact surface 72a of the stool 72 is sloped and the fixed pin 86 is transversely spaced so that the support stool 72 is unstable and tends to pivot the stool 72 counterclockwise against the torsion spring 90, when the support stool 72 and roller 66 are engaged. Additionally, a light torsion spring 91, as shown in FIGURES 1 and 3, may be included to also urge the stool 72 and the crank 76 counterclockwise. The spring 91 overcomes the deadweight of the components of the latch assembly 70 including the electromagnetic device 100.

As a result of the above arrangement, the latch assembly 70 is capable of supporting the fulcrum point F of the arm 60 in the latched position shown in FIGURE 1 only when the bell crank 76 is held in a clockwise direction by the armature 98 of the electromagnetic device 100. To accomplish this support, the electromagnetic device 100 is connected to a circuit which is normally energized to prevent movement of the armature 98. The device 100 thus normally maintains the support stool 72 engaged with the roller 66, and maintains the arm fulcrum point F in the latched position shown in FIGURE 1. On the other hand, when the electromagnetic device 100 is de-energized the support stool 72 will rotate counterclockwise into the position shown in FIGURE 4 and no longer provide support for the arm 60 at the fulcrum point F. The arm 60 can then pivot about the pivot pin 64 and swing the fulcrum point F down to its released position, as also shown in FIGURE 4.

Referring now to FIGURES 1 and 2, the cam member 40 is fixed within the upper housing 12 to the inside end of a rotatable cam shaft 110. In the preferred arrangement the cam member 40 is disposed in substantially vertical alignment with the arcuate lever arm 60. The shaft 110 is rotatably supported on the housing 12 by a suitable bushing 112, and extends outwardly beyond the housing 12 to define a crank arm 114. An operating handle 116 is included on the crank arm 114 to permit an operator to rotate the cam shaft 110 and the cam 40 in unison during the operation of the valve actuating mechanism 30. Of course, it will be appreciated that the crank arm 114 can be operated automatically by a suitable motor assembly, instead of manually, without departing from the present invention.

As seen in FIGURES 1, 4 and 5, the cam member 40 is a peripheral cam, and includes a projecting lobe 42 which defines a cam rise segment '$r$.' The cam 40 also includes a recess 44 in peripheral communication with the lobe 42 by a steep cam slope. The recess 44 thereby defines a quick-action cam fall segment '$f$' directly following the rise segment '$r$' on the contour of the cam 40. Finally, the 360-degree contour of the cam 40 is completed by a cam lift segment '$l$.' The cam lift segment '$l$' preferably has a profile so that the cam 40 moves a follower from the fall segment '$f$' to the rise segment '$r$' with substantially uniform movement.

The construction of the valve actuating mechanism 30 in accordance with this invention is completed by the provision of a cam follower member, generally indicated by the reference numeral 120. As seen from FIGURES 1 and 2, the follower member 120 in this embodiment comprises a pair of spaced plates 122 pivotally connected by a pin 124 to the lever arm 60 at a point intermediate the ends of the lever arm. The pin 124 thereby defines an actuating point A on the arm 60 which is spaced from the operating point P and fulcrum point F. As explained further hereinafter, the lever arm 60 of the valve actuating mechanism 30 thus functions as a third class lever during the operation of the gate valve 20.

Each of the plates 122 includes a slot 126 which fits loosely over the cam shaft 110 so that the cam follower member 120 is free to move vertically or transversely within the upper housing 12. The cam follower member 120 is completed by mounting a cam roller 130 on a pin 128 connected between the lower ends of the spaced plates 122. As shown in FIGURES 1, 4 and 5, the cam roller 130 engages with the periphery of the cam member 40 and causes the cam follower member 120 to move in response to the rotation of the cam member 40.

Under normal operating conditions, the valve actuating mechanism 30 of this invention maintains the safety valve 20 in an open position, as shown in FIGURE 1, so that the flow of fluid through the pipeline 16 is unrestricted. In this normal operating condition the electromagnetic device 100 is energized, and operates to maintain the support stool 72 engaged with the roller 66 on the arm 60. The fulcrum point F of the arm 60 is thereby securely supported in its latched position by the latch assembly 70, and the arm 60 can pivot about the fulcrum point F in response to rotation of the cam member 40.

More particularly, the operating handle 116 under normal conditions is properly positioned by a releasable detent (not shown) which maintains the cam member 40 oriented with the cam rise segment '$r$' engaged with the cam roller 130, as shown in FIGURE 1. The upper housing 12 may also be provided with a suitable indicator such as a dial or the like (not shown) to aid in placing the operating handle 116 in this normal position. Since the arm fulcrum point F is supported by the latch assembly 70, the engagement of the cam segment '$r$' with the cam roller 130 forcibly urges the cam follower member 120 and its associated pivot pin 124 downwardly as viewed in FIGURE 1. The lever arm 60 is urged to rotate in a clockwise direction about its fulcrum point F, and depresses the operating rod 50 against the bias of the compression spring 58. Accordingly, the cam member 40 and the cam follower member 120 operate through the lever arm 60 to maintain the valve operating rod 50 in a downward position, thereby maintaining the safety valve 20 in the normal opened position as illustrated in FIGURE 1.

In accordance with this invention, the actuating mechanism 130 can be selectively operated to open or close the safety valve 20 under normal conditions, when the arm fulcrum point F is supported by the latch assembly 70. Thus, the safety valve 20 can be quickly closed by rotating the operating handle 116 and the cam member 40 in a clockwise position, as indicated by the arrow in FIGURE 1. The rotation of the handle 116 through a small arc will disengage the handle detent (not shown) and move the cam rise segment '$r$' from the cam roller 130. As seen in FIGURE 5, the cam roller 130 will then follow the contour of the cam 40 and will be snapped into engagement with the cam fall segment '$f$' by the upward biasing force of the spring 58. The spring 58 simultaneously moves the operating rod 50 upwardly, and quickly moves the safety valve 20 into its closed position. The slots 126 provided in the cam follower member 120 permit the cam follower to move upwardly without engaging with the cam shaft 110.

If it is desired to manually reopen the safety valve 20 while normal conditions prevail, the operating handle 116 is again turned in a clockwise direction to disengage the cam roller 130 from the cam fall segment '$f$' and bring the lifting cam segment '$l$' into engagement with the roller 130. Continued rotation of the operating handle 116 will then cause the cam roller 130 to roll along the lifting cam segment '$l$' until the handle detent (not shown) is in place and the cam roller 130 is again engaged with the cam rise segment '$r$.' The cam member 40 thus operates through the cam roller 130, the cam follower member 120 and the lever arm 60 to depress the operating rod 50 and reopen the safety valve 20.

Under emergency operating conditions, such as when the fluid system in which the valve apparatus 10 is employed experiences a power loss or fire danger, a suitable control circuit (not shown) senses the emergency and de-energizes the electromagnetic device 100. The armature 98 is then released, and the latch assembly 70 is no longer capable of supporting the arm 60 at the fulcrum point F.

Accordingly, the support stool 72 will be urged in a counterclockwise direction, as viewed in FIGURE 1, and disengage the roller 66. As seen in FIGURE 4, since the operating cam 40 remains in its normal position with the cam rise segment '$r$' engaged with the cam roller 130, the release of the roller 66 permits the force of the spring 58 to pivot the arm 60 about the actuating point A. The arm fulcrum point F thereby swings from its latched position to its lower released position (FIGURE 4), and the operating rod 50 snaps the safety valve 20 closed.

It is apparent from FIGURE 4 that the rotation of the cam member 40 will not transmit force to the valve operating rod 50 or the safety valve 20 as long as the arm fulcrum point F is not supported by the support stool 72. Thus, the valve actuating mechanism 30 in accordance with this invention is inoperative to control the positioning of the safety valve 20 as long as the emergency condition prevails, and the electromagnetic device 100 is de-energized.

The torsion spring 90 of the latch assembly 70 will return the support stool 72 into its supporting position, as shown in FIGURES 1 and 5, immediately after the arm fulcrum point F swings into the released position shown in FIGURE 4. However, due to the slope of the contact surface 72a and the mounting of the support stool 72, as described above, the stool 72 cannot adequately support the arm 60 at its fulcrum point F until the electromagnetic device 100 is reenergized.

Upon reactivation of the electromagnetic device 100, the valve actuating mechanism 30 of this invention can be rapidly recocked, and the safety valve 20 can be quickly returned to its normal opened position. In this regard, the recocking is accomplished by rotating the operating handle 116 and the cam member 40 through a small arc until the cam roller 130 is disengaged from the cam rise segment 'r.' As shown in FIGURE 5, this small rotation of the cam member 40 permits the cam follower member 120 to move upwardly with respect to the cam member 40. The torsion spring 68 will then pivot the lever arm 60 in a clockwise direction around the operating point P into the position shown in FIGURE 5. The cam roller 130 is thereby brought into engagement with the cam fall segment 'f,' and the arm fulcrum point F is swung back to its latched position, with the arm roller 66 supported on the stool 72.

After the recocking of the lever arm 60 is completed, the cam member 40 is rotated through the remaining arc to reset the safety valve 20 in its normal position. This rotation brings the cam roller 130 into rolling engagement with the cam lift segment 'l,' and urges the cam follower member 120 downwardly from the position shown in FIGURE 5 to the position shown in FIGURE 1. The lever arm 60 simultaneously rotates in a clockwise direction about the fulcrum point F, and forces the valve operating rod 50 downwardly against the action of the spring 58. The safety valve 20 is reset in the normally opened position shown in FIGURE 1 when the cam roller 130 once again engages with the cam rise segment 'r.'

Of course, it will be appreciated that the valve actuating apparatus 30 may be automatically operated by replacing the operating handle 116 with a suitable motor (not shown). The motor would function to selectively rotate the cam shaft 110 and the cam member 40 in a clockwise direction during the operation of the valve apparatus 10, and would thus bring the cam segments 'r,' 'f' and 'l' into successive engagement with the cam roller 130 in the same manner as described above. As is well-known to those skilled in the art, the motor could also be programed to releasably retain the cam member 40 in the normal position shown in FIGURE 1, and the above-described releasable detent would be unnecessary.

In addition, it will be appreciated that the valve actuating mechanism 30 may be arranged for manual recocking by rotation of the cam shaft 110 and the cam member 40 in a counterclockwise direction. In this alternative embodiment, the handle 116 is provided with a suitable fixed stop (not shown) which maintains the cam member 40 in the normal position shown in FIGURE 1 by precluding further clockwise rotation of the cam beyond that position. Under normal operating conditions, with the latch assembly 70 engaged with the roller 66 as shown in FIGURE 1, the cam member 40 can be rotated in a counterclockwise direction. The upward biasing force of the spring 58 will cause the cam roller 130 to roll along the cam lift segment 'l' from the cam rise segment 'r' to the cam fall segment 'f,' and thereby close the safety valve 20. The safety valve 20 can be similarly reopened under normal operating conditions by rotating the handle 116 and the cam member 40 clockwise until the suitable handle stop is again engaged. During such clockwise rotation, the cam roller 130 rolls along the cam lift segment 'l' from the cam segment 'f' to the cam segment 'r,' and causes the safety valve 20 to be reopened.

After an emergency signal has caused the valve actuating mechanism 30 to move into the position shown in FIGURE 4, this alternative embodiment permits the mechanism 30 to be recocked by counterclockwise rotation of the cam member 40. As seen from FIGURE 4, counterclockwise rotation of the cam member 40 moves the cam roller 130 from the cam segment 'r' to the cam segment 'f.' As this movement of the cam roller 130 occurs, the torsion springs 68 will cause the arm 60 to swing about the operating point P from the released position shown in FIGURE 4 to the latched position shown in FIGURE 5. After such recocking is completed, clockwise rotation of the cam member 40 will then return the cam roller 130 into engagement with the cam rise segment 'r,' and thereby reopen the safety valve 20.

From the above description it will be apparent that the valve actuating mechanism 30 in accordance with this invention provides an improved, quick-acting safety valve apparatus. For instance, the inclusion of the cam member 40 permits the valve actuating mechanism 30 to be rapidly recocked, and operates to quickly reset the safety valve 20 in its normal position. Additionally, the cam member 40 provides the actuating mechanism 30 with an improved, uniform mechanical advantage, and allows the work stroke of the actuating mechanism to continue during the complete 360-degree rotation of the cam shaft 110.

FIGURE 6 illustrates a symmetrical double-lobed cam 40a which may be substituted for the single-lobed cam 40 in the valve actuating apparatus 30 of this invention. Compared to the single-lobed cam 40, the profile of the double-lobed cam 40a defines two cam rise segments 'ra,' two cam fall segments 'fa,' and two cam lifting segments 'la.' The operation of the actuating mechanism 30 provided with the cam 40a is substantially identical to the operation with the single-lobed cam 40. However, since the cam segments 'ra,' 'fa' and 'la' are sequentially spaced along 180 degrees of the contour of cam 40a, the cycle of the valve actuating apparatus 30 including the cam 40a would be completed upon rotation of the cam shaft 110 through a 180-degree arc. Similarly, a full rotation of the cam shaft 110 would result in two complete cycles of the valve actuating apparatus.

Although the invention has been described with a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention.

What is claimed is:

1. A valve actuating mechanism comprising, in combination, valve operating means movable between a first position and a second position, first biasing means urging said operating means toward said second position, lever means joined to said operating means and movable between a cocked position and a released position, latching means adapted to releasably support said lever means in said cocked position, second biasing means urging said lever means toward said cocked position, a cam follower joined to said lever means, and a rotatable cam member spaced adjacent said cam follower, said cam member including a cam periphery defining a first cam segment adapted to engage said cam follower to releasably retain said valve operating means in said first position when said lever means is in said cocked position and to permit said first biasing means to move said valve operating means rapidly toward said second position when said lever means moves from said cocked position to said released position, said cam member further including a second cam segment adapted to engage said cam follower to permit said second biasing means to rapidly recock said lever means by swinging said lever means toward said cocked position when said second cam segment engages said cam follower with said lever means in said released position, said cam member further including a third cam segment adapted to engage said cam follower to cause said valve operating means to move from said second position to said first position with substantial mechanical advantage after said lever means has been recocked by said rapid swinging of said lever means from said released position to said cocked position.

2. A valve actuating mechanism in accordance with claim 1, wherein said first and second cam segments are successively engageable with said cam follower and wherein said second segment is further adapted to engage said cam follower to permit said first biasing means to rapidly move said valve operating means into said second position when said lever means is in said cocked position.

3. A valve actuating mechanism comprising in combination, valve operating means movable between a first position and a second position, first biasing means urging said operating means toward said second position, lever means engaging with said valve operating means and defining fulcrum point means spaced transversely from said operating means, said lever means at said fulcrum point means being movable between a latched position and a released position, second biasing means urging said fulcrum point means toward said latched position, latching means engageable with said lever means to releasably support said fulcrum point means in said latched position, cam follower means engaged with said lever means, and a rotatable cam member spaced adjacent said cam follower means, said cam member including a cam periphery defining at least one first peripheral cam segment adapted to engage with said cam follower means to releasably retain said valve operating means in said first position when said fulcrum point means is supported by said latching means in said latched position and to allow said first biasing means to rotate said lever means and move said operating means rapidly toward said second position when said fulcrum point means swings from said latched position to said released position, said cam member further including at least one second peripheral cam segment adapted to engage with said cam follower means to cause said valve operating means to move between said first and second positions with ease when said fulcrum point means is supported by said latching means in said latched position, and said cam member further including at least one third peripheral cam segment adapted to engage with said cam follower means to permit said second biasing means to rapidly recock said lever means by swinging said fulcrum point means rapidly from said released position into engagement with said latching means in said latched position.

4. A valve actuating mechanism in accordance with claim 3, wherein said cam segments are successively engageable with said cam follower and the cycle of operation of said actuating mechanism is completed upon rotation of said cam member through three hundred and sixty degrees.

5. A valve actuating mechanism in accordance with claim 3, wherein said cam segments are successively engageable with said cam follower and the cycle of operation of said actuating mechanism is completed upon rotation of said cam member through less than three hundred and sixty degrees.

6. A valve actuating mechanism in accordance with claim 5, wherein said cam segments are successively engageable with said cam follower and the cycle of operation of said actuating mechanism is completed upon one hundred and eighty degree rotation of said cam member.

7. A valve actuating mechanism in accordance with claim 3, wherein a plurality of said first, second and third cam segments are defined by said cam periphery.

8. A valve actuating mechanism in accordance with claim 3 including electromagnetic means connected to said latching means and operable, when energized, to retain said latching means in supporting engagement with said lever means at said fulcrum point means.

9. A valve actuating mechanism in accordance with claim 3, wherein said second biasing means urging said fulcrum point means toward said latched position comprises a torsion spring mounted between said lever means and said valve operating means.

10. A valve actuating mechanism comprising, in combination, valve operating means movable between a first position and a second position and biased toward said second position, lever means pivotally connected to said valve operating means at an operating point and defining fulcrum point means spaced from said operating point, said lever means at said fulcrum point means being movable between a latched position and a released position, biasing means urging said fulcrum point means toward said latched position, releasable latching means engageable with said lever means to releasably support said fulcrum point means in said latched position, cam follower means connected to said lever means at an actuating point spaced from said operating point and fulcrum point means, and a rotatable cam member spaced adjacent said cam follower means, said cam member having a cam periphery defining a series of cam segments successively engageable with said cam follower means comprising, a first cam segment engageable with said cam follower means, when said fulcrum point means is supported in said latched position to releasably maintain said operating means in said first position and, upon release of said latching means from said lever means, to permit said operating means to move rapidly toward said second position in response to movement of said fulcrum point means toward said released position, a second cam segment rotatable into engagement with said cam follower means to rapidly release said actuating point and permit said biasing means to rapidly recock said mechanism by swinging said lever means about said operating point and return said fulcrum point means from said released position to said latched position, and a third cam segment defined by said cam periphery engageable with said cam follower to pivot said lever means about said fulcrum point means and return said valve operating means from said second position to said first position with ease upon rotation of said cam member with said fulcrum point means supported in said latched position.

11. A valve actuating mechanism in accordance with claim 10, wherein said rotatable cam member is spaced below said lever means and wherein said cam follower means comprises a strap link pivotally connected to and depending downwardly from said lever arm and having a cam follower mounted on said link for engagement with the periphery of said rotatable cam.

References Cited

UNITED STATES PATENTS 2,301,876  11/1942  Hurlburt _____ 251—69
3,082,627  3/1963  Yeo et al. _____ 74—2

MILTON KAUFMAN, Primary Examiner

U.S. Cl. X.R.

251—69, 74